United States Patent [19]

Adamson

[11] Patent Number: 4,878,424
[45] Date of Patent: Nov. 7, 1989

[54] COOKING APPARATUS

[75] Inventor: Lee F. Adamson, Roscoe, Ill.

[73] Assignee: Specialty Equipment Companies, Inc., Rockton, Ill.

[21] Appl. No.: 268,194

[22] Filed: Nov. 7, 1988

[51] Int. Cl.⁴ .......................... A47J 37/06; F24C 3/04
[52] U.S. Cl. ....................................... 99/349; 99/331; 99/340; 99/374; 99/422; 126/39 G
[58] Field of Search .................. 99/422, 349, 372, 377, 99/379, 374, 380, 331, 332, 378, 340, 357, 424, 425, 376, 375, 444, 448; 126/92 R, 92 AC, 92 C, 21 A, 21 R, 91 A, 39 BA, 39 E, 39 G, 39 N, 39 J, 39 K, 39 R, 39 D, 39 H, 214 A, 214 R; 431/326, 328, 329, 170, 19, 69, 70, 71, 89, 18; 219/524, 525, 443, 449, 457, 279, 446, 454, 460, 464, 510; 16/250, 387; 49/387, 383

[56] References Cited

U.S. PATENT DOCUMENTS

| | | | |
|---|---|---|---|
| 1,835,331 | 12/1931 | Pickup | 16/387 X |
| 2,304,140 | 12/1942 | Bergholm | 126/39 N |
| 2,313,968 | 3/1943 | Reich | 99/375 |
| 4,165,682 | 8/1979 | Weiss | 99/331 |
| 4,483,239 | 11/1984 | Mueller et al. | 99/340 |
| 4,586,428 | 5/1986 | Adamson | 99/332 |
| 4,601,237 | 7/1986 | Harter et al. | 99/349 |
| 4,607,609 | 8/1986 | Keating | 99/422 X |
| 4,639,213 | 1/1987 | Simpson | 431/326 |
| 4,700,619 | 10/1987 | Scanlon | 99/349 |
| 4,724,823 | 2/1988 | Simpson | 126/39 D X |

Primary Examiner—Harvey C. Hornsby
Assistant Examiner—Scott J. Haugland
Attorney, Agent, or Firm—Vernon J. Pillote

[57] ABSTRACT

A cooking apparatus having a lower cooking platen and an upper cooking platen mounted on a plate support arm for swinging movement between a lower cook position and a raised position inclined upwardly from the lower platen. The rearward portion of the lower platen is heated by a gas fired infrared heater having a combustion chamber vent passage formed along the rear of the combustion chamber. A combustion observation window is provided in a forward wall of the combustion chamber of the rear infrared heater, and an electrical heater is provided for heating the forward portion of the lower platen and arranged so that the observation window can be viewed from the front of the cooking apparatus. The platen support arm has an arcuate intermediate portion that slidably extends through an opening in a rear cover on the cooking apparatus.

16 Claims, 4 Drawing Sheets

COOKING APPARATUS

BACKGROUND OF THE INVENTION

Cooking apparatus of the type having a lower cooking platen and a movable upper cooking platen, sometimes referred to as clamshell cooking apparatus or clamshell grills, are well known. Some prior art patents such as U.S. Pat. Nos. 4,165,682; 4,483,239; 4,601,237 and 4,700,619 disclose clamshell grills in which heating of the lower platen can be by either gas burners, radiant heat or electric heaters, with the upper platen is heated by electric heaters. U.S. Pat. No. 4,586,428 discloses a clamshell grill in which a plurality of electrical heaters are provided for heating different areas of the lower platen, and with other electrical heaters for heating the upper platen. Clamshell grills of the type disclosed in U.S. Pat. No. 4,586,428 have also been made by the assignee of the present invention, in which the upper cooking platen was arranged for two-sided cooking only on a rearward portion of the lower platen that is spaced a substantial distance from the forward edge of the lower platen, and with separate electrical heaters for the rearward and forward portion of the lower platen so arranged that the electrical heaters for only the rearward portion are operated during two-sided cooking on the rearward portion of the lower platen, and in which the electrical heaters for both the rearward and the forward portions of the lower platen are operated during single sided cooking on the lower platen.

Clamshell type grills are commonly used in restaurants and fast food establishments where floor space is at a premium. It is accordingly desirable to minimize the floor area required by the cooking apparatus at the rear and sides of the lower cooking platen. In clamshell type grills, mechanism is required for swingably supporting, counterbalancing and actuating the upper platen between its lower and raised position, and this mechanism is commonly located at the rear of the lower cooking platen. In addition, in gas fired clamshell grills it is necessary to vent the combustion products to an exhaust outlet usually located at the rear of the cooking apparatus. Further, the American National Standard for Gas Food Service Equipment requires convenient means be provided for observing the flames of the burners when the cooking apparatus is installed. If the means for observing the flames is located at either or both sides of the cooking apparatus, then additional floor space would be required at the sides of the cooking apparatus.

SUMMARY OF THE INVENTION

The present invention relates to a clamshell tYpe cooking apparatus.

In accordance with one aspect of the invention there is provided clamshell type top having a gas fired infrared heater for heating at least a portion of the lower platen and which has an improved arrangement for venting the combustion chamber in a manner that does not require additional space at the rear of the lower platen.

In accordance with a second aspect of the invention there is provided a clamshell type cooking apparatus having gas fired infrared heater for heating a rearward portion of the lower cooking platen, and which has electrical heating means for selectively heating the forward portion of the lower cooking platen, which electrical heating means is constructed and arranged so as to enable observing the flames in the combustion chamber of the rearward infrared heating means from a position at the front of the cooking apparatus.

In accordance with a further aspect of the invention there is provided a clamshell grill type cooking apparatus having an improved arrangement for swingably mounting the upper cooking platen, to minimize flow or dripping of grease from the upper cooking platen into the area at the rear of the lower cooking platen, when the upper cooking platen is in its raised position.

DETAILED DESCRIPTION

Figure 1:
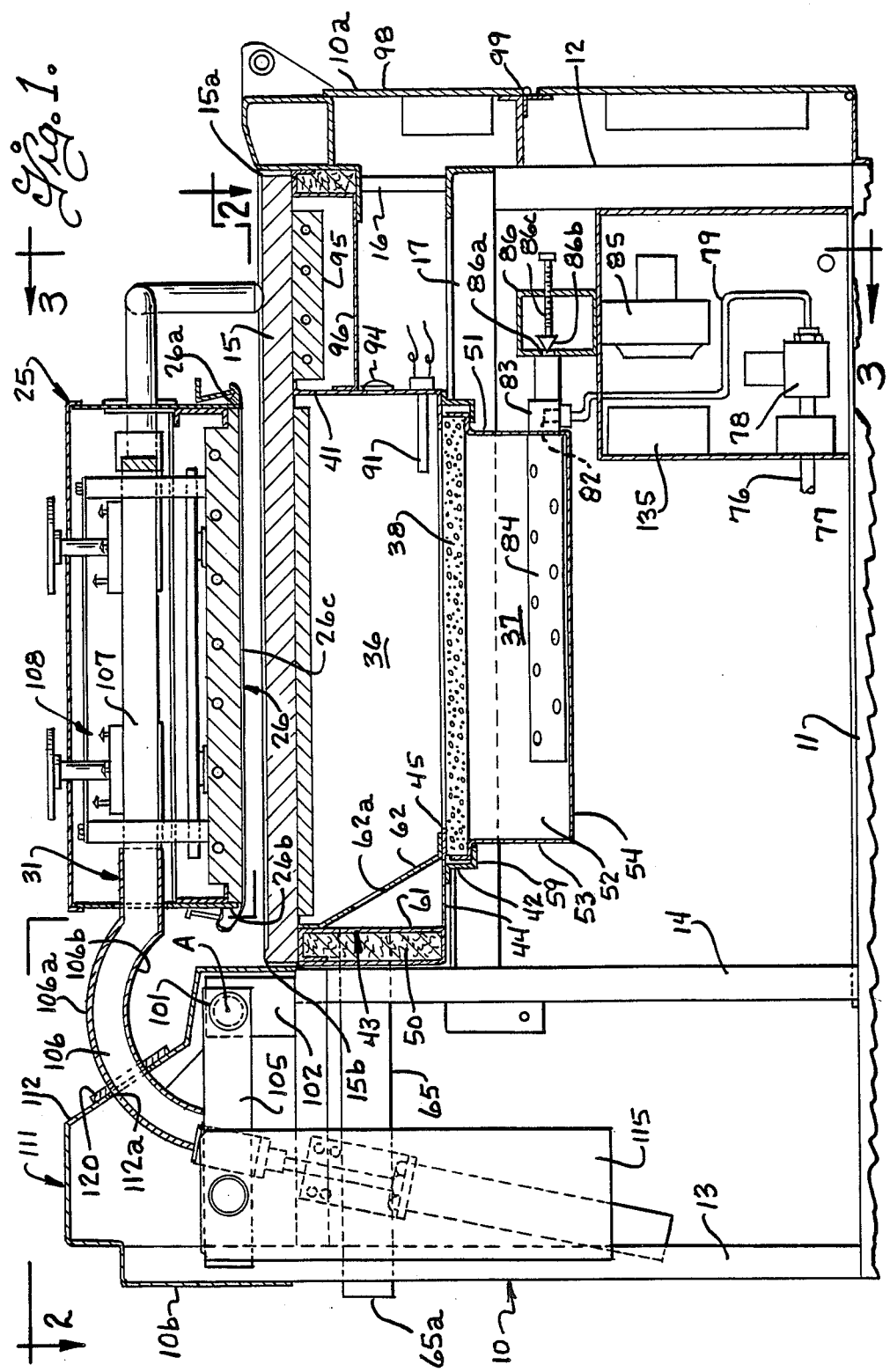
FIG. 1 is a vertical sectional view through the cooking apparatus.

The cooking apparatus comprises a rigid support structure 10 having a front 10a and a rear 10b. The support structure is conveniently in the form of a rigid weldment including base frame members 11, front uprights 12, rear uprights 13 and intermediate uprights 14 adjacent the rear of the support structure. A lower cooking platen 15, formed of a heat conductive material such as steel plate, is mounted as by posts 16 (FIG. 1) on the generally horizontally frame members 17 that extend between the front and intermediate uprights 12 and 14. The lower cooking platen 15 has forward and rear edges 15a and 15b and a smooth flat upper cooking surface 15c.

In the embodiment illustrated, the lower cooking platen 15 is made relatively wide, for example of the order of three feet or more, to provide a large cooking surface, and two movable upper cooking platen assemblies designated 25 and 25' in FIG. 1, are provided to cooperate with different areas of the lower cooking platen. As best shown in FIG. 1, the upper cooking platen assemblies 25 and 25' are disposed in side-by-side relation and each have a width slightly less than one-half the width of the lower cooking platen. The upper cooking platen assemblies 25 and 25' are of like construction and like numerals are used to designate corresponding parts. As is deemed apparent, a single upper cooking platen assembly could be used, if desired.

Each upper cooking platen assembly includes upper cooking platen 26 formed of a heat conductive material, such as cast aluminum plate, with a flat smooth cooking face 26c at the underside. The upper cooking platens are each mounted on a respective platen support arm means 31 for movement about an axis A adjacent the rear of the lower cooking platen between a lower cook position as shown in FIG. 1 and a raised position inclined upwardly from adjacent the rear edge of the lower cooking platen. Any suitable means may be provided for mounting the upper cooking platen on the platen support arm 31 for movement therewith between a lower and a raised position. The upper cooking platen may, for example, be mounted on the platen support arm 31 in a manner disclosed in U.S. Pat. No. 4,586,428, the disclosure of which is incorporated herein by reference.

It is desirable in some installations, to arrange the clamshell cooking apparatus so as to enable two-sided cooking on only a rearward portion of the lower cooking platen spaced from of the front side of the lower platen, while yet enabling both the rearward and forward portions of the lower cooking platen to be utilized for one-sided cooking. As shown in FIG. 1, the upper cooking platen has a shorter front to rear dimension than the lower cooking platen and is arranged so as to overlie only a rearward portion of the lower cooking platen when the upper cooking platen is in its lower cook position. Thus, when the upper cooking platen is in its lower position, the cooking platen has its forward edge 26a spaced rearwardly a substantial distance from the forward edge 15a of the lower cooking platen, while the rear edge 26b of the upper platen is adjacent the rear edge 15b of the lower platen. In order to conserve energy and reduce heat dissipation in the cooking area during two-sided cooking, provision is made for heating only the rearward portion of the lower platen in the area below the upper cooking platen during two-sided cooking, and for heating both the rearward and forward portions of the lower cooking platen during one-sided cooking or grilling.

A gas fired infrared heater means is provided for heating the rearward portion of the lower cooking platen. In the embodiment illustrated having two upper cooking platens 25, 25' in side-by-side relation, two gas fired infrared heaters 35, 35' are provided for heating the areas of the lower platen below the respective upper cooking platens 25, 25'. The gas fired infrared heaters 35, 35' are of like construction and like numerals are used to designate corresponding parts. Each gas fired infrared heater includes combustion chamber housing means defining a combustion chamber 36 at the underside of the lower cooking platen; burner plenum chamber housing means defining a burner plenum chamber 37 below the associated combustion chamber 36, and a generally horizontal gas permeable burner plate means 38 and separating the burner plenum chamber from the combustion chamber. The combustion chamber housing means includes front wall means 41, side wall means 42, and rear wall means 43 and bottom wall means 44 defining a burner plate opening 45. The front, side and rear wall means have flanges at their upper edges secured to the underside of the lower platen 15 in sealed relation therewith, and outer shroud members 48 and 49 are preferably provided along the side and rear of the combustion chamber housing with insulation 50 therebetween to reduce heat loss from the combustion chamber. The burner plenum chamber housing means includes a front wall 51, spaced side walls 52, a rear wall 53 and a bottom wall 54. The gas permeable burner plate means 38 is secured and is sealed around its periphery to the upper edges of the burner plenum chamber housing and may, for example, be clamped to a flange 56 provided along the upper edges of the front, side and rear walls of the burner plenum chamber housing means. The burner plenum chamber housing means and the gas permeable burner plate are preferably removably mounted on the bottom wall of the combustion chamber housing means below the burner opening 45, as by generally Z-shaped support strips 59.

Figure 2:
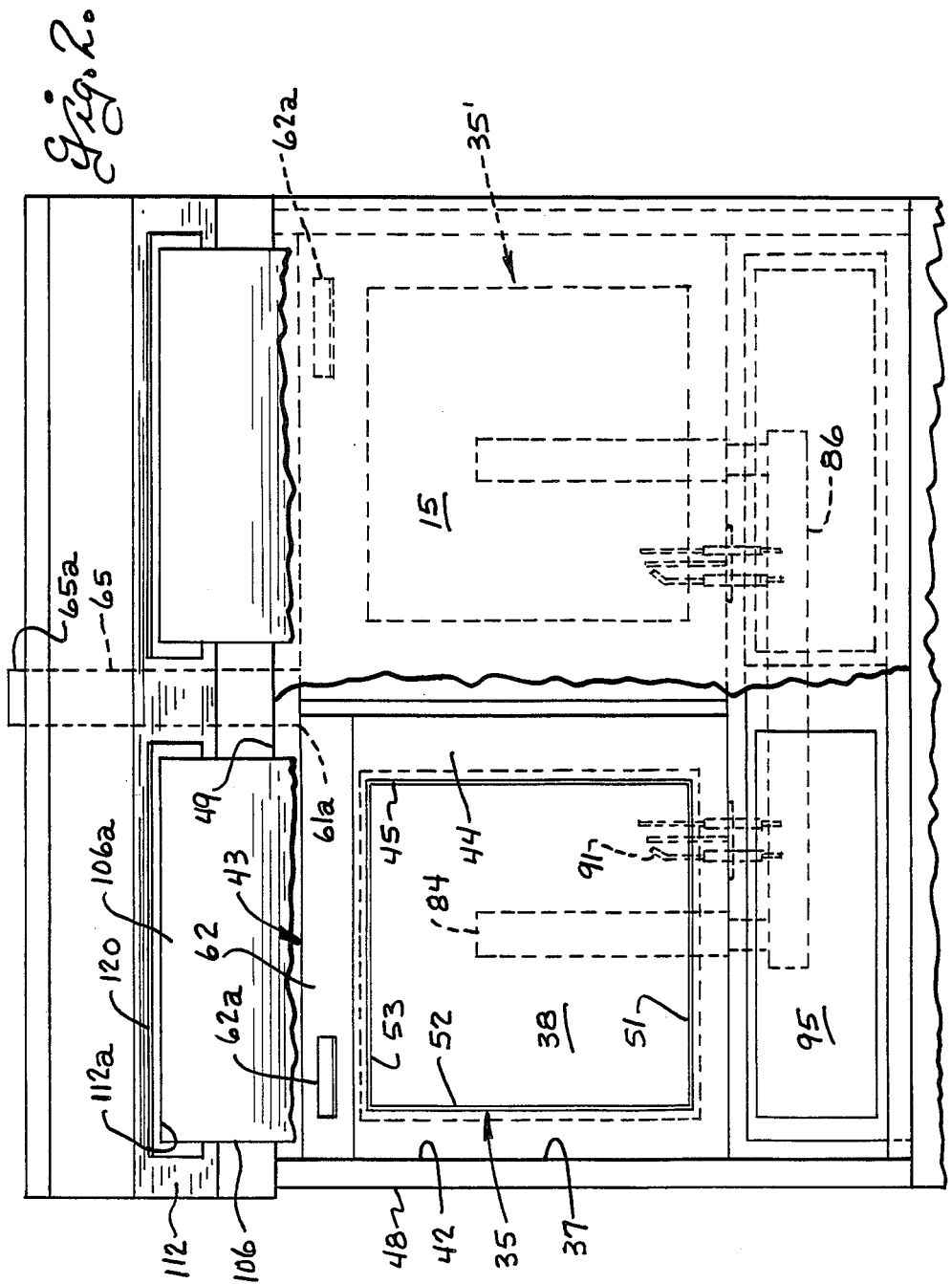
FIG. 2 is a top view of the cooking apparatus with parts broken away on the section line 2—2 of FIG. 1 and with part of the lower platen broken away to illustrate details of construction.
Figure 3:
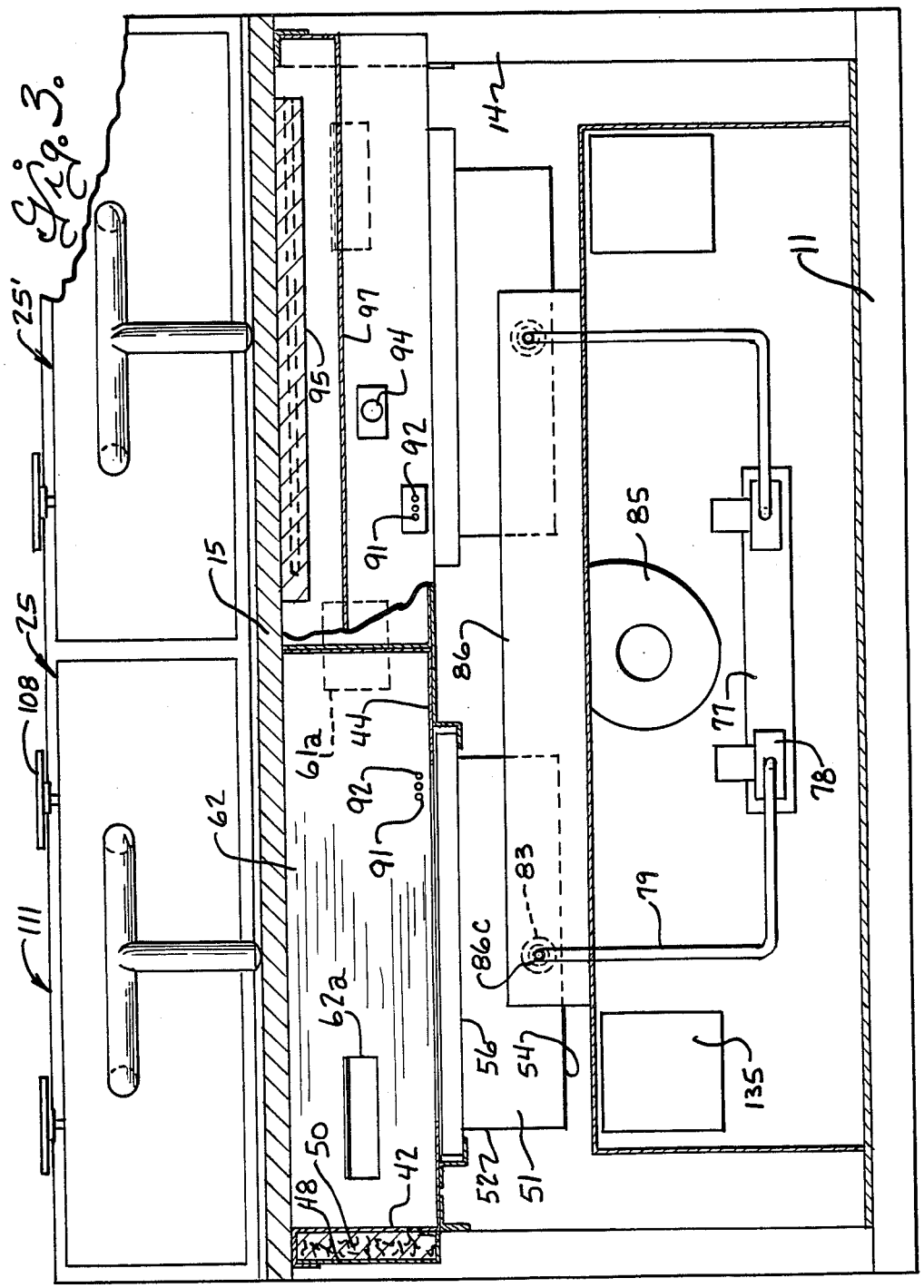
FIG. 3 is a vertical sectional view through the cooking apparatus taken on the broken section line 3—3 of FIG. 1 and with parts of the combustion chamber housing broken away to illustrate details of construction.

As best shown in FIG. 1, the rear wall means of the combustion chamber is attached to the lower platen adjacent its rear edge 15b and is constructed and arranged to define a vent passage along the rear side of the combustion chamber forwardly of the rear edge of the lower platen. The rear wall means 43 of the combustion chamber includes an outer rear wall 61 having an exhaust outlet 61a therein, and a divider wall 62 having a vent opening 62a therein. The divider wall is inclined downwardly and forwardly relative to the outer wall 61 and is affixed to the bottom wall 44 adjacent the rear edge of the burner opening 45. Thus, combustion gases from the combustion chamber pass through the vent opening 62a and through the vent passage between the divider wall and rear wall, and out through the exhaust outlet 61a. With this arrangement, the vent passage does not require any additional space rearwardly of the lower platen and yet allows the radiant and convection heat in the combustion chamber to heat the area at the underside of the lower platen that is circumscribed by the combustion chamber. In addition, the vent opening 62a is horizontally offset from the exhaust outlet 61a so that combustion gases flowing through the vent passage heat the divider wall. Since the divider wall is inclined downwardly and forwardly relative to the outer wall it tends to reflect heat upwardly to the rear portion of the lower platen and thus aids in heating the rear portion of the lower platen. An exhaust duct 65 is attached to the outer wall 61 of the combustion chamber around the vent opening 61a and extends rearwardly therefrom as shown in FIGS. 1 and 2 and terminate in an outlet end 65a adjacent the rear of the support structure, which is adapted for communication with an exhaust duct in the building. A means such as a plate 71 or fins, formed of a metal such as aluminum having good heat conducting characteristics, may advantageously be secured to the underside of the lower platen in heat conducting relation therewith, to enhance transfer of radiant and convection heat from the combustion chamber to the lower platen.

Several types of gas fired infrared heaters are currently available in which a combustible mixture is conveyed to a gas permeable burner plate, such as a porous refractory, and wherein combustion takes place at the surface of the porous plate or within the pores of the porous plate, so that the porous plate becomes heated and emits infrared radiation. Gas fired infrared heaters are commonly operated in the open atmosphere such that the pressure at the ignition-combustion surface of the porous plate is essentially atmospheric. In the preferred embodiment illustrated, the infrared burner system is generally of the type disclosed in U.S. Pat. No. 4,639,213, the disclosure of which is incorporated herein by reference, and wherein the pressure in the combustion chamber is slightly above atmospheric. In general, gas is supplied under a preselected regulated pressure through line 76 to a gas manifold 77, and gas from the manifold is supplied through a solenoid operated valve 78 and line 79 to a metering orifice 82 that feeds into a venturi type mixer 83. The mixer 83 is connected to an apertured combustible fuel distribution pipe 84 that extends into the plenum chamber 37. Air at above atmospheric pressure is supplied from a blower 85 to an air plenum chamber 86 and air from the plenum chamber 86 is delivered through an adjustable orifice 86a to the venturi type mixer 83. As best shown in FIG. 1, a cone shaped member 86b is mounted on a threaded rod 86c for adjustment relative to the orifice 86a, to enable adjustment of the fuel air ratio. As more fully disclosed in the aforementioned U.S. Pat. No. 4,639,213, the porous plate is of a type which produces both a pressure and temperature gradient between the plenum and combustion chambers and the pressurized gas supply and blower and mixer are arranged to introduce the air/gas mixture into the plenum at a pressure above atmospheric pressure and such as to cause the mixture to flow through the porous plate and drop to a lower pressure in the combustion chamber. The amount of air is adjusted by cone 86b in relation to the gas metered through the gas orifice 82a such that combustion of the air/gas mixture occurs substantially at the surface of the porous plate that faces the combustion chamber so that the porous plate is heated to infrared radiation emitting temperature. The outlet end 65a of the exhaust duct 65 is at substantially atmospheric pressure. However, the outlet end of the exhaust duct is remote from the combustion chamber 36 so that there is a pressure gradient between the combustion chamber and the point of exhaust 65a.

In the preferred embodiment disclosed, the gas fired infrared heater is arranged to heat only the rearward portion of the lower platen corresponding to the area of the upper cooking platen, for two-sided cooking. The front wall means 41 of the combustion chamber is spaced rearwardly a substantial distance from the forward edge 15a of the lower platen and is located adjacent the forward edge of the upper platen when the latter is in its lower cook position. An igniter electrode 91 is mounted in the front wall 41 at a location to ignite gas at the surface of the gas permeable plate 38 and a flame sensing electrode is mounted on the front wall of the combustion chamber for sensing if the igniter has succeeded in lighting the burner. The American National Standard For Gas Food Service Equipment requires that a convenient means shall be provided for observing flames of all pilot burners and burners of the atmospheric type during normal operation. A combustion view opening or window 94 is provided in the front wall of the combustion chamber at a location to enable observing the flames of the pilot burner and the infrared burner. In order to enable observation of the view window 94 from the front of the cooking apparatus, the portion of the lower cooking platen forward of the combustion chamber 36 is heated by an electrical heater means 95 which is affixed to the underside of the forward portion of the lower platen in heat conducting relation therewith. The underside of the electrical heater 95 means is preferably covered by a shroud 96 to reduce heat loss and to minimize the danger of injury to the user. The electrical heater means 95 has a vertical depth which is shallow as compared to the depth of the combustion chamber and the electrical heater means and shroud 96 are constructed and arranged so that the underside is at a level above the flame observation window 94 to enable visual inspection of the observation window ;rom the front of the cooking apparatus. An access door 98 is hingedly mounted at 99 on the support structure such that the observation window 94 can be viewed from the front of the cooking apparatus, when the door 98 is swung down to an open position.

As previously described, the platen support arm means 31 is mounted on the support structure for pivotal movement about a generally horizontal axis A adjacent the rear edge 15b of the lower cooking platen. As best shown in FIG. 1, the arm support means includes a cross shaft 101 that is rotatably supported in bearing blocks 102 affixed to the support structure. In prior art clamshell grill such as disclosed in U.S. Pat. No. 4,586,428, some problems were encountered with grease and other cooking products dripping and falling off the upper cooking platen into the area rearwardly of the lower cooking platen, when the upper cooking platen was in its raised position. In accordance with another aspect of the present invention, an improved upper platen support arm means is provided and arranged to minimize and effectively eliminate dripping or falling of grease and other debris into the area at the rear of the upper platen. As best shown in FIG. 1, the upper platen support arm means 31 includes a rear portion 105 that extends rearwardly from the pivot axis A; an arcuate intermediate portion 106 that is fixed to the rear portion at a location rearwardly of the pivot axis and extends forwardly therefrom to a location forwardly of the pivot axis, and a forward portion 107 extending forwardly from the intermediate portion. A means designated generally by the numeral 108 is provided for mounting the upper platen on the forward portion of the support arm means for movement between a lower cook position extending generally horizontally above the lower cooking platen in a raised position inclined upwardly from the lower cooking platen. The means 108 for mounting the upper cooking platen on the forward portion of the support arm means 31, may conveniently be of the type disclosed in the aforementioned U.S. U.S. Pat. No. 4,586,428. A rear cover means 111 is mounted on the support structure rearwardly of the upper cooking platen and the rear cover means includes a panel 112 that is inclined upwardly and rearwardly and defines an arm receiving opening 112a disposed in a plane generally radially of the pivot axis A. The arcuate intermediate portion 106 of the support arm projects through the opening 112a and extends through an angle at least as large as the angle of movement of the support arm means between the lower cook position and the raised position. The upper cooking platen is adapted to move upwardly through an angle of about 65° to 70° from its lower cook position, and the arcuate intermediate portion extends forwardly from the panel 112 through a somewhat greater arc, for example about 75°. As best shown in FIGS. 1 and 2, the arcuate intermediate portion is advantageously covered by outer and inner semi-cylindrical walls 106a and 106b concentric with the pivot axis A, and a wiper 120, conveniently formed of a material such as a silicone elastomer is fixed to the rear cover means around the arm receiving opening 112a and in substantial wiping contact with the walls 106a and 106b of the arcuate intermediate portion of the plate support arm means. With this arrangement, there is a close fit between the arcuate intermediate portion of the support arm means and the rear cover in all operative positions of the upper cooking platen, such that drainage or dripping of grease and other products from the upper cooking platen into the area at the rear of the lower platen, is substantially prevented.

As shown in FIG. 1, a means such as a counterbalance weight 115 is pivotally mounted on the rear portion 105 of the platen support arm means 31, rearwardly of the point of attachment of the arcuate intermediate portion thereto. Any suitable means, for example as disclosed in U.S. Pat. No. 4,586,428, may be provided for controlling operation of the upper platen support arm to selectively hold the platen in either a raised and/or lowered position.

Figure 4:
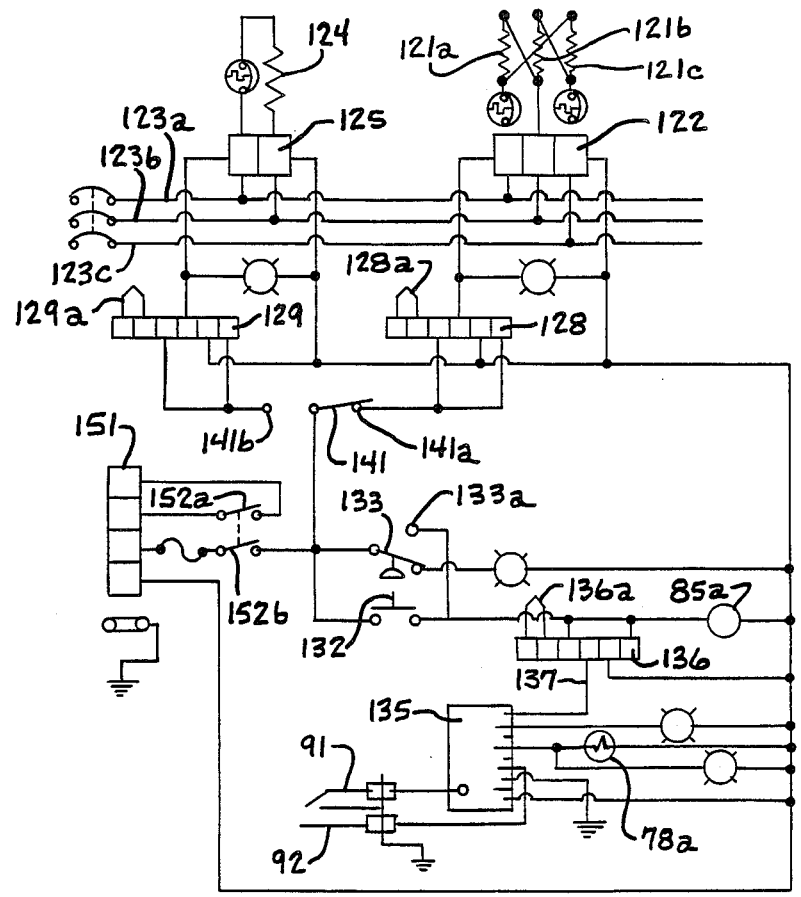
FIG. 4 is schematic diagram of the electrical controls for the cooking apparatus.

Reference is now made more specifically to the schematic electrical diagram in FIG. 4. Separate heaters and controls are provided for each side of the dual clamshell cooking apparatus and the heaters and controls for only one side of the unit are shown in FIG. 4, it being understood that like heaters and controls are provided for the other side of the cooking unit. As diagrammatically shown in FIG. 4, electrical heaters 121a–121c for the upper platen 26 are connected through mercury relays 122 to power supply conductors 123a–123c, and the electrical heater 124 for the forward platen heater 95 is electrically connected through mercury relays 125 to the power supply conductors. Mercury relay 122 is controlled by a temperature controller 128 having a temperature sensing element or thermocouple 128a that is responsive to the temperature of the upper platen. The mercury relay 125 for the front heater 95 is controlled by temperature controller 129 having a thermocouple 129a responsive to the temperature of the front heater. The motor 85a for the fan or blower 85 is connected in series with a normally open manually operable start switch 132 which is operative, when closed, to energize the fan motor and start the fan. An air pressure switch 133 is mounted so as to be responsive to the pressure in the air manifold 86 produced by the fan 85, and is operative when the fan pressure builds up to a preselected valve, to close contacts 133a and establish a holding circuit in parallel with the start switch 132 to maintain the fan energized. The infrared gas burner is operated under control of an igniter 135 and temperature controller 136. The temperature controller 136 is connected in parallel with the fan motor 85a so as to be energized when the fan motor is energized and the temperature controller is connected through a line 137 to the igniter 135 to signal the igniter when burner operation is required. The igniter electrode 91 and the flame sensing electrode 92 are connected to the igniter 135 and the solenoid 78a for the gas valve 78 is also connected to the igniter. The temperature controller 136 has a temperature sensor such as a thermocouple 136a for sensing the temperature on the portion of the lower platen heated by the infrared gas burner and, when the temperature controller senses that heat is required, it transmits a signal through line 137 to the igniter 135. When the igniter receives a signal from line 137, it initiates a spark at the igniter electrode 91 and simultaneously energizes the solenoid 78a to open the gas valve 78. If a flame is sensed by the sensing or flame electrode 92 within a preselected time, for example three seconds, the spark at the igniter electrode 91 is terminated and the infrared burner operates until the temperature sensor 136a of the temperature controller 136 senses that the temperature of the heated area of the lower platen reaches a preselected range. Once this occurs, the igniter deenergizes the solenoid 78a of the gas valve 78, until the temperature sensor 36 again senses a call for heat.

In the clamshell cooking apparatus illustrated wherein the upper platen is arranged for two-sided cooking on only the rearward portion of the lower platen, only the electrical heaters 121a–121c for the upper platen are energized during two-sided cooking. During one-sided cooking, the heaters 121a–121c for the upper platen are deenergized and the electrical heater 124 for the forward portion of the lower platen is energized. As shown in FIG. 4, a switch 141 is arranged for movement into engagement with a first contact 141a for energizing the heaters in the upper platen, and to a second position in engaging contact 141b to energize the front heater 124.

As previously described, the outlet 65a of the exhaust duct 65 is arranged to discharge into the exhaust system, commonly provided in restaurants for exhausting air from the cooking area and hood. An interlock is provided to assure that the building exhaust fan system is in operation before the cooking apparatus can be operated. In FIG. 4, numeral 151 represents a terminal block. The building exhaust fan (not shown) is adapted for connection of terminal 1 and power is supplied from terminal 2 through interlock switch 152a to terminal number 1, when the interlock switch is closed. Terminal 3 is adapted for connection to a source of 110 volt A.C. power and terminal 3 is connected through an interlock switch 152b to the manual start and air switches 132 and 133, respectively, to apply power thereto when the interlock switch is closed.

To summarize operation, the user closes the interlock switches 152a, 152b to start the building exhaust fan and apply power to the start switch 132. Switch 141 is positioned to engage either contact 141a for two-sided cooking or contact 141b for single sided cooking. The user then closes start switch 132 to start the blower 85 and the pressure switch 133 then closes against contact 133a to maintain a holding circuit to the blower. The temperature controller sends a signal through line 137 to the igniter 135. The igniter actuates the spark electrode 91 and also opens the gas valve 78. If the flame sensor 92 senses that the gas has ignited within a preselected period for example three seconds, then the igniter deenergizes the igniter electrode and the burner will continue in operation until the temperature sensor 136a senses that the area of the lower platen heated by the burner reaches a selected temperature. At that time, the temperature controller sends a signal to the igniter 135 to close the gas valve.

During two-sided cooking, the electric heaters 121a–121c are energized under the temperature controller 128 to heat the upper platen. The heater 124 for the forward portion of the lower platen is deenergized during two-sided cooking and this not only conserves energy but also makes it more comfortable for the operator to apply and remove products from the rear portion of the lower platen. During single sided cooking, the upper platen is positioned in a raised position and the electric heaters for the upper platen are deenergized while the front heater on the lower platen is energized under the control of temperature controller 129.

The embodiments of the invention in which an exclusive property or privilege is claimed are defined as follows:

1. A cooking apparatus comprising: a support structure, a lower cooking platen fixedly mounted on the support structure and having forward and rear edges, at least one upper cooking platen, means mounting the upper cooking platen on the support structure for movement therewith between a lower cook position extending generally horizontally above the lower cooking platen and a raised position inclined upwardly from the lower cooking platen, at least one gas fired infrared heater including combustion chamber housing means defining a combustion chamber at the underside of the lower cooking platen; burner plenum chamber housing means defining a burner plenum chamber below the combustion chamber; and a generally horizontal gas permeable burner plate means between and separating the burner plenum chamber from the combustion chamber, input means for introducing a combustible mixture into said burner plenum chamber, the combustion chamber housing means including front, side and rear wall means sealed to the lower cooking platen, the rear wall means defining a horizontally extending vent passage along a rear side of the combustion chamber, said rear wall means including outer wall means having an exhaust outlet and divider wall means inclined downwardly and forwardly relative to the outer wall means and forming a common wall between the combustion chamber and the vent passage, the divider wall means having a vent opening therein whereby combustion gases from the combustion chamber pass through the vent opening and into the vent passage to the exhaust outlet.

2. A cooking apparatus according to claim 1 wherein the vent opening communicates with the vent passage at a location spaced along the vent passage from the exhaust outlet.

3. A cooking apparatus according to claim 1 wherein the gas permeable burner plate means has a rear edge offset forwardly relative to the rear edge of the lower cooking platen, the divider wall means being inclined downwardly and forwardly from the lower cooking platen to the burner plate means.

4. A cooking apparatus according to claim 1 wherein said combustion chamber housing means includes front wall means spaced rearwardly a substantial distance from the forward edge of said lower cooking platen and having window means for visually observing combustion conditions in the combustion chamber, and electrical heater means affixed to the underside of the lower platen in heat conducting relation therewith in an area forwardly of the combustion chamber housing means, the electrical heater means having a bottom side disposed at a level above the window means and such to enable visual monitoring of combustion conditions in the combustion chamber from the front of the cooking apparatus.

5. A cooking apparatus according to claim 1 wherein said upper cooking platen has a forward end spaced rearwardly a substantial distance from the forward edge of the lower cooking platen when the upper cooking platen is in said cook position, said combustion chamber housing means including front wall means spaced rearwardly a substantial distance from the forward edge of said lower cooking platen and having window means therein for visually observing combustion conditions in the combustion chamber, and electrical heater means affixed to the underside of the lower platen in heat conducting relation therewith in an area forwardly of the combustion chamber housing means, the electrical heater means having a lower side disposed at a level above the window means and such as to enable viewing of the window means from the front of the cooking apparatus.

6. A cooking apparatus according to claim 1 wherein the means mounting the upper cooking platen includes upper platen support arm means mounted on the support structure for pivotal movement through an angle about a generally horizontal axis adjacent the rear edge of the lower cooking platen, the support arm means having a rear portion extending rearwardly from the pivot axis; an arcuate intermediate portion fixed to the rear portion at a location rearwardly of the pivot axis and extending forwardly therefrom to a location forwardly of the pivot axis, and a forward portion extending forwardly from the intermediate portion, means mounting the upper platen on the forward portion of the support arm means for movement therewith between a lower cook portion extending generally horizontally above the lower cooking platen and a raised position inclined upwardly from the lower cooking platen, rear cover means mounted on the support structure rearwardly of the upper cooking platen, the rear cover means having means defining an arm receiving opening therethrough disposed in a plane generally radially of said pivot axis, said arcuate intermediate portion of the support arm means having radially inner and outer wall means disposed concentric with said pivot axis and extending through said arm receiving opening, said arcuate intermediate portion of said support arm means extending through an angle at least as large to the angle of movement of said support arm means between said lower cook position and said raised position.

7. A cooking apparatus according to claim 6 wherein said means defining the arm receiving opening includes wiper means disposed in sliding engagement with said arcuate intermediate portion of said support arm means.

8. A cooking apparatus comprising: a support structure, a lower cooking platen fixedly mounted on the support structure and having forward and rear edges, at least one upper cooking platen, upper platen support arm means mounted on the support structure for pivotal movement through an angle about a generally horizontal axis adjacent the rear edge of the lower cooking platen, the support arm means having a rear portion extending rearwardly from the pivot axis; an arcuate intermediate portion fixed to the rear portion at a location rearwardly of the pivot axis and extending forwardly therefrom to a location forwardly of the pivot axis, and a forward portion extending forwardly from the intermediate portion, means mounting the upper platen on the forward portion of the support arm means for movement therewith between a lower cook position extending generally horizontally above the lower cooking platen and a raised position inclined upwardly from the lower cooking platen, rear cover means mounted on the support structure rearwardly of the upper cooking platen, the rear cover means having means defining an arm receiving opening therethrough disposed in a plane generally radially of said pivot axis, said arcuate intermediate portion of the support arm means having radially inner and outer wall means disposed concentric with said pivot axis and extending through said arm receiving opening, said arcuate intermediate portion of said support arm means extending through an angle at least as large to the angle of movement of said support arm means between said lower cook position and said raised position.

9. A cooking apparatus according to claim 8 wherein said means defining arm receiving opening includes wiper means disposed in sliding engagement with said arcuate intermediate portion of said support arm means.

10. A cooking apparatus comprising: a support structure, a lower cooking platen fixedly mounted on the support structure and having forward and rear edges, upper cooking platen means, means mounting the upper cooking platen means on the support structure of movement between a lower cook position extending generally horizontally above the lower cooking platen and a raised position inclined upwardly from the lower cooking platen, gas fired infrared heater means including combustion chamber housing means defining first and second combustion chambers in side-by-side relation at the underside of the lower cooking platen; burner plenum chamber housing means defining first and second burner chambers below the first and second combustion chambers respectively; and first and second generally horizontal gas permeable burner plate means between and separating the first and second combustion chambers from the respective first and second burner plenum chambers, first and second input means for introducing a combustible mixture into the first and second burner plenum chamber respectively, the combustion chamber housing means having wall means at the front, sides and rear of the first and second combustion chambers, the wall means at the rear of the first and second chambers defining a horizontally extending vent passage means and including outer wall means having an exhaust outlet and first and second divider wall means inclined downwardly and forwardly relative to the outer wall means and respectively forming a common wall between the first and second combustion chambers and the vent passage means, the first and second divider wall means each having a vent opening therein whereby combustion gases from the first and second combustion chambers pass through the associated vent opening and into the vent passage means to the exhaust outlet.

11. A cooking apparatus according to claim 10 wherein the vent openings each communicate with the vent passage at a location spaced along the vent passage from the exhaust outlet.

12. A cooking apparatus according to claim 10 wherein the wall means at the front of the first and second combustion chambers is spaced rearwardly a substantial distance from the forward edge of the lower cooking platen and has first and second window means therein for viewing the combustion conditions in the first and second combustion chambers respectively, and electrical heater means affixed to the underside of the lower platen in heat conducting relation therewith in an area forwardly of the wall means at the front of the first and second combustion chambers, the electrical heater means having a bottom side disposed at a level above the first and second window means and such as to allow viewing of the window means from the front of the cooking apparatus.

13. A cooking apparatus comprising: a support structure, a lower cooking platen fixedly mounted on the support structure and having forward and rear edges, at least one upper cooking platen means mounting the upper cooking platen on the support structure for movement between a lower cook position extending generally horizontally above the lower cooking platen and a raised position inclined upwardly from the lower cooking platen, at least one gas fixed infrared heater including combustion chamber housing means defining a combustion chamber at the underside of the lower cooking platen; burner plenum chamber housing means having means defining a burner plenum chamber below the combustion chamber; and a generally horizontal gas permeable burner plate means between and separating the burner plenum chamber from the combustion chamber, input means for introducing a combustible mixture into said burner plenum chamber, the combustion chamber housing means including front, side and rear wall means sealed to the lower cooking platen, said front wall means being spaced rearwardly a substantial distance from the forward edge of said lower cooking platen and having window means therein for viewing combustion conditions in the combustion chamber, and electrical heater means affixed to the underside of the lower platen in heat conducting relation therewith in an area forwardly of the combustion chamber housing means, the electrical heater means having a lower side disposed at a level above the window means and such as to allow viewing of the window means from the front of the cooking apparatus.

14. A cooking apparatus according to claim 13 wherein said upper cooking platen has a forward end spaced rearwardly a substantial distance from the forward edge of the lower cooking platen when the upper cooking platen is in said cook position.

15. A cooking apparatus according to claim 13 wherein the means mounting the upper cooking platen includes upper platen support arm means mounted on the support structure for pivotal movement through an angle about a generally horizontal axis adjacent the rear edge of the lower cooking platen, the support arm means having a rear portion extending rearwardly from the pivot axis; an arcuate intermediate portion fixed to the rear portion at a location rearwardly of the pivot axis and extending therefrom to a location forwardly of the pivot axis, and a forward portion exending forwardly from the intermediate portion, means mounting the upper platen on the forward portion of the support arm means for movement between a lower cook portion extending generally horizontally above the lower cooking platen and a raised position inclined upwardly from the lower cooking platen, rear cover means mounted on the support structure rearwardly of the upper cooking platen, the rear cover means having means defining an arm receiving opening therethrough disposed in a plane generally radially of said pivot axis, said arcuate intermediate portion of the support arm means, having radially inner and outer wall means disposed concentric with said pivot axis and extending through said arm receiving opening, said arcuate intermediate portion of said support arm means extending through an angle at least as large to the angle of movement of said support arm means between said lower cook position and said raised position.

16. A cooking apparatus according to claim 15 wherein said means defining the arm receiving opening includes wiper means disposed in sliding engagement with said arcuate intermediate portion of said support arm means.

* * * * *